(12) United States Patent
Albero

(10) Patent No.: US 10,229,226 B2
(45) Date of Patent: Mar. 12, 2019

(54) METHOD OF CHARACTERIZING A BUNDLE OF ELECTRIC CABLES

(71) Applicant: LABINAL POWER SYSTEMS, Blagnac (FR)

(72) Inventor: Franck Albero, Plaisance du Touch (FR)

(73) Assignee: Safran Electrical & Power, Blagnac (FR)

( * ) Notice: Subject to any disclaimer, the term of this patent is extended or adjusted under 35 U.S.C. 154(b) by 335 days.

(21) Appl. No.: 15/030,773

(22) PCT Filed: Oct. 23, 2014

(86) PCT No.: PCT/FR2014/052697
§ 371 (c)(1),
(2) Date: Apr. 20, 2016

(87) PCT Pub. No.: WO2015/063395
PCT Pub. Date: May 7, 2015

(65) Prior Publication Data
US 2016/0253436 A1    Sep. 1, 2016

(30) Foreign Application Priority Data

Oct. 28, 2013    (FR) ...................................... 13 60483

(51) Int. Cl.
*H01B 9/00*       (2006.01)
*G06F 17/50*      (2006.01)
*H01B 13/012*     (2006.01)

(52) U.S. Cl.
CPC .......... *G06F 17/50* (2013.01); *G06F 17/5095* (2013.01); *H01B 9/003* (2013.01);
(Continued)

(58) Field of Classification Search
CPC ...... G06F 17/50; G06F 17/5095; H01B 9/003
(Continued)

(56) References Cited

U.S. PATENT DOCUMENTS 4,117,712 A * 10/1978 Hager, Jr. ............. G01J 5/0003
374/29
5,817,980 A * 10/1998 Kirma ...................... H02G 3/06
174/86

(Continued)

FOREIGN PATENT DOCUMENTS

DE    10 2011 110253 A1    3/2012
FR    2 970 579 A1         7/2012

OTHER PUBLICATIONS

Audrius Ilgevicius ("Analytical and numerical analysis and simulation of heat transfer in electrical conductors and fuses", Thesis, Universität der Bundeswehr München, 2004, pp. 1-139).*

(Continued)

*Primary Examiner* — Kamini S Shah
*Assistant Examiner* — Iftekhar A Khan
(74) *Attorney, Agent, or Firm* — Bookoff McAndrews, PLLC

(57) ABSTRACT

A method of characterizing a bundle (1) of electrical cables (2, 3, 4, . . . ), comprising taking into consideration for at least one surface temperature of the cables ($T_{surface}$), firstly of at least one sum of heat fluxes ($\Phi_1$, $\Phi_2$, . . . , $\Phi_n$) calculated for each cable (2, 3, 4, . . . ) for the heating effect due to the electrical resistance of each cable passing a respective electric current ($i_1$, $i_2$, . . . , $i_n$), and secondly of a heat flux ($\Phi_s$) calculated for the heat given off by the bundle (1) into its environment in order to make the dimensioning of the cables (2, 3, 4, . . . ) compatible with their use.

20 Claims, 1 Drawing Sheet

(52) U.S. Cl.
CPC ... *H01B 13/01209* (2013.01); *G06F 2217/36* (2013.01); *G06F 2217/80* (2013.01)

(58) Field of Classification Search
USPC .............................................................. 703/1
See application file for complete search history.

(56) References Cited

U.S. PATENT DOCUMENTS

| | | | | | |
|---|---|---|---|---|---|
| 5,856,768 | A * | 1/1999 | Hey-Shipton | ............. | H01P 1/04 333/260 |
| 6,037,546 | A * | 3/2000 | Mottine | ................. | H01B 3/441 174/110 PM |
| 6,781,051 | B1 * | 8/2004 | Linossier | ............... | H01Q 13/20 174/102 R |
| 6,879,941 | B1 * | 4/2005 | Ehrenberg | .......... | B60R 16/0207 123/195 A |
| 6,886,152 | B1 * | 4/2005 | Kong | ................. | G06F 17/5054 716/128 |
| 7,057,734 | B2 * | 6/2006 | Jacobs | ................... | B64G 1/283 244/165 |
| 7,318,671 | B1 * | 1/2008 | Moghaddam | .......... | G01N 25/18 374/30 |
| 7,586,313 | B2 * | 9/2009 | Hernandez-Marti | ........................ | G01R 31/021 324/538 |
| 7,676,771 | B2 * | 3/2010 | Boubekeur | ......... | B60R 16/0207 716/127 |
| 8,058,882 | B2 * | 11/2011 | Hernandez-Marti | ........................ | G01R 31/021 324/303 |
| 8,882,344 | B2 * | 11/2014 | Kwon | .................... | G01K 17/20 374/29 |
| 9,093,217 | B2 * | 7/2015 | Duval | ..................... | H01F 30/12 |
| 9,500,539 | B2 * | 11/2016 | Hubble | .................. | G01K 17/00 |
| 9,816,876 | B2 * | 11/2017 | Poret | ........................ | G01K 7/16 |
| 2001/0038612 | A1 * | 11/2001 | Vaughn | ............... | G06F 17/5077 370/256 |
| 2002/0004715 | A1 * | 1/2002 | Iimori | ................. | G06F 17/5036 703/14 |
| 2003/0047997 | A1 * | 3/2003 | Bernier | .................. | B64D 41/00 307/9.1 |
| 2005/0271350 | A1 * | 12/2005 | Boubekeur | ......... | B60R 16/0207 385/147 |
| 2006/0260837 | A1 * | 11/2006 | Manousiouthakis | .. | H01B 12/16 174/125.1 |
| 2008/0238634 | A1 * | 10/2008 | Diab | ........................ | G01K 7/00 340/538 |
| 2009/0322554 | A1 * | 12/2009 | Hernandez-Marti | ........................ | G01R 31/021 340/854.9 |
| 2011/0145773 | A1 * | 6/2011 | Best | ...................... | G06F 17/509 716/112 |
| 2011/0210844 | A1 * | 9/2011 | Dey | .................... | G08B 13/1445 340/521 |
| 2014/0124232 | A1 * | 5/2014 | Sarchi | ................... | F16L 11/127 174/27 |

OTHER PUBLICATIONS

Patricia Cahill ("An Evaluation of the Flammability of Aircraft Wiring ", U.S. Department of Transportation, 2004, pp. 1-39).*
Search Report dated Feb. 26, 2015, in corresponding International PCT Application No. PCT/FR2014/052697, filed on Oct. 23, 2014 (3 pages).

* cited by examiner

METHOD OF CHARACTERIZING A BUNDLE OF ELECTRIC CABLES

CROSS-REFERENCE TO RELATED APPLICATIONS

This application is the U.S. national phase entry under 35 U.S.C. § 371 of International PCT Application No. PCT/FR2014/052697, filed on Oct. 23, 2014, which claims priority to French Patent Application No. FR 1360483, filed on Oct. 28, 2013, the entireties of each of which are incorporated by reference herein.

TECHNICAL FIELD

The invention lies in the field of methods of characterizing electrical systems for industrial use, and in particular cabling systems for transferring electrical power and possibly digital information.

Characterization seeks to best adapt the design or the use of the systems in question.

BACKGROUND

The cabling systems to which the invention applies include particularly, but not exclusively, cabling systems for aircraft, e.g. cabling systems that convey both the electrical power needed for powering on-board electrical loads and also signals for communication by networks. The invention also applies to cabling systems that convey only power.

The cables of interest may be cables made of copper, or aluminum, which may be shielded or not shielded, and which are connected together in bundles that are uniform or non-uniform, i.e. bundles of cables that are identical, similar, or different, and that run in parallel, being assembled together using collars or fasteners, e.g. arranged every 5 centimeters (cm).

When designing and using cable bundles, it is appropriate to pay attention to the thermal stresses to which the cables will be subjected. In particular, it is common practice to set a maximum heating limit (power given off by the Joule effect) for cables, so as to limit Joule effect losses, and also to set a maximum temperature and/or heating limit so that human maintenance operators are not in danger of being burnt when acting on the cables and so that the cables and their environments are not damaged.

In order to design and use such bundles, for cables that transfer electrical power, it is also appropriate to take account of the voltage drop that is authorized between the load and the power supply, as a function of the type of power supply network, e.g. a 28 volt direct current (DC28) network, or a 115 volt or 230 volt alternating current (AC115 or AC230) network. The maximum power feed to the cable and its electrical resistance, optionally after temperature correction, are considered by taking account, if there is correction, of the above-mentioned maximum temperature, which constitutes a conservative approximation that is very far removed from an optimum calculation. Conversely, if there is no correction, the results obtained are also very far from reality. Finally, it is appropriate to take account of the ability to withstand mechanical tension, so as to avoid damage by pulling out and partial or total breaking associated with the mechanical forces that might be applied to the cable. This aspect of design is governed by empirical rules that are not addressed herein.

The present disclosure seeks to improve how thermal constraints and voltage drops are taken into account. It seeks to provide an improvement in a field where reasoning is often applied by assuming that bundles are uniform, without taking account of the non-uniformity of the cables present therein, and in particular while taking into consideration only a single level of electrical loading of the cables, without specifying whether the cables rise in temperature or not, even though a power cable and a network communication cable do not heat up in the same way. This single loading level is selected by considering a single configuration of the system, e.g. an airplane, typically by considering that all of the equipment is operating at the same time, that pressure is at a minimum, and that temperatures are at their maximums. Naturally, such assumptions are excessively conservative, since certain pieces of equipment, such as landing gear actuators, are active for only a few seconds in any one flight. Furthermore, proceeding in that way amounts to imposing constraints that are incompatible since, for example, the main and emergency power supply circuits for a given piece of equipment are never powered simultaneously, or for example the maximum temperature is never reached at the same time as the minimum pressure.

In practice, those prior methods are based on very general calculation charts and involve calculating the temperature of each cable, and then comparing the temperatures as calculated in this way with the maximum allowable temperature. Very large safety margins are used since the calculations are performed cable by cable without taking account of the structure of the bundle, and also because the charts that are used are very conservative because of their general nature.

A method that is more expensive in terms of computation is known as the multi-physical method since it involves simulation that is complete, both electrically and thermally. This involves calculations involving time, with integrations to simulate transient stages in order to calculate the temperatures of each of the cables in each branch of the bundle corresponding to respective zones of the airplane and to calculate the diameters that are to be given to those cables. The temperature that is reached is compared with the maximum allowable temperature.

Such a calculation makes it possible to reduce the margin used when dimensioning cables and bundles, but it is cumbersome and impractical for systems involving numerous cables or electrical connections that are too complex, as applies for cabling in airplanes, since it implies that a model needs to be generated beforehand for each system under study, the model needs to be opened each time modeling is performed, parameters are modified, the simulation is executed, the results are collected, and the model is closed, which is highly constraining.

General Presentation

In order to solve this difficulty and provide a practical response to the above-mentioned complex industrial problem, there is provided a method of characterizing a bundle of electrical cables, comprising taking into consideration for at least one surface temperature of the cables, firstly of at least one sum of heat fluxes calculated for each cable for the heating effect due to the electrical resistance of each cable passing a respective electric current, and secondly of a heat flux calculated for the heat given off by the bundle into its environment in order to make the dimensioning of the cables compatible with their use.

By means of these principles, and for reduced cost in terms of computation, it is possible to optimize the design or the use of cable bundles, and in particular to design them while reducing their weight, and while still satisfying utilization constraints. Although the calculations are performed in conservative manner so as to guarantee that the solution that is retained is reliable, they are nevertheless more accurate than the calculations obtained using prior solutions.

Said sum of fluxes and said flux may in particular be taken into consideration by calculating them, in particular by calculating the flux concerning the heat given off, for a given surface temperature of the cables constituting a constraint to be satisfied and by comparing the numerical values as calculated in this way. Said sum of incoming fluxes and said outgoing flux may also be considered by solving an equation to obtain the surface temperatures of the cables that are actually reached in operation.

In certain implementations, said sum of fluxes and said flux are compared at the maximum surface temperature of the cables for operation without degradation of the cables, at the maximum surface temperature of the cables for operation that guarantees safety for human operators acting on the cables.

Furthermore, said sum of fluxes and said flux may be compared while using currents that correspond to maximum heating values in operation for limiting in-line energy losses for each cable to the recommended level. Alternatively, comparison may be performed using currents that correspond to an intended use for the cables.

In other implementations, said sum of fluxes and said fluxes are compared at different temperatures in order to determine the temperatures actually reached.

The invention may also include evaluating, for at least one power cable of the bundle, a voltage drop calculated between the two ends of the cable. In certain applications of the invention, preliminary design of the cable bundle is performed by determining the diameters of the cables or by recommending that one or more cables be excluded from the bundle.

It is also possible to modify the bundle design in order to reduce the weight of the bundle while complying with an operating temperature constraint. In an implementation, the outgoing heat flux and the capacity for thermal dissipation of the environment for which the bundle is designed are also compared. This makes it possible to anticipate a potential risk of the environment overheating, which would be damaging for the environment and also undermines the ambient temperature on which the calculations for dimensioning the bundle are based.

Preferably, the material and the electrical load specific to each cable of the bundle are taken into account when calculating fluxes.

Still preferably, the cables making up an electrical connection conveyed via a plurality of cable bundles may be of section that varies along their length.

In a particular industrial application, the bundle is a bundle for an aircraft.

Under such circumstances, it is proposed that, when calculating the temperature rise of bundles during each stage of flight, account is taken of the electrical loading cycles of equipment, of temperature and pressure variations in zones of the aircraft, and of the characteristics of zones of the aircraft.

There is also provided a bundle of cables fabricated by a method of fabrication including characterization in accordance with the above-specified principles.

The invention is described below with reference to the accompanying figures.

BRIEF DESCRIPTION OF THE DRAWINGS

Other advantages and features of the invention will become apparent upon reading the following description referring to the appended drawings wherein.

DETAILED DESCRIPTION

In the following detailed description, it is referred to the accompanying drawings showing examples of compaction assembly or examples of manufacturing process. It is intended that these examples be considered as illustrative only, the scope of the invention not being limited to these examples.

Figure 1:
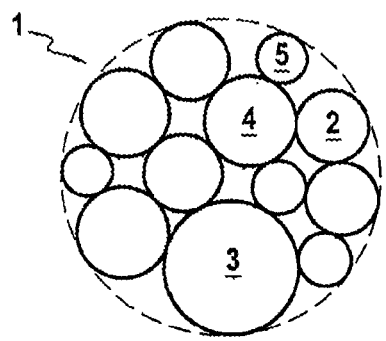
FIG. 1 shows a bundle of cables.

FIG. 1 is a section view showing an example of a bundle 1 of cables to which the invention applies. It is made up of cables 2, 3, 4, . . . of different diameters, that are tied together by collars, e.g. arranged once every 5 cm (not shown). The cables, which are generally circular in section, are pressed against one another. Some of them are made of aluminum and others are made of copper, or indeed of other materials. Some of them are electrical power supply cables, e.g. cables for powering landing gear or electrical racks in an aircraft, and others are data communication cables for transmitting data from one node of a telecommunications network to another node of the network, e.g. a network on board an aircraft.

Figure 2:
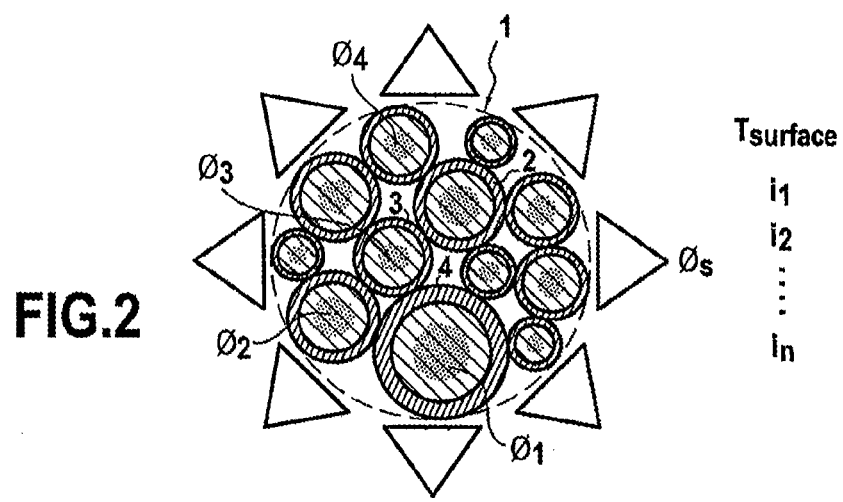
FIG. 2 illustrates the principles of the invention.

FIG. 2 illustrate the principles of the invention. In accordance with the invention, provision is made both to calculate an overall outgoing heat energy flux $\Phi_s$ for a cable surface temperature $T_{surface}$ that is assumed to be constant, i.e. under steady conditions, and for currents $i_1, i_2, \ldots, i_n$ flowing in the cables that correspond to the intended use of the cables, which flux is calculated for the bundle as a whole while taking account of the environment (temperature and pressure) in which said bundle is situated, and also to calculate the incoming energy fluxes $\Phi_1, \Phi_2, \ldots, \Phi_n$ for the various cables. The sum of the incoming fluxes $\Phi_1, \Phi_2, \ldots, \Phi_n$ is then compared with the outgoing flux $\Phi_s$.

In this calculation, transient stages are ignored. However this solution provides all of the functions made available by a multi-physical simulation, while minimizing computation.

Instead of comparing the temperature reached with the authorized maximum temperature, as has been done in the past, the incoming and outgoing fluxes as simulated at a given surface temperature are compared. It is thus verified whether an authorized maximum level of heating is exceeded. This is the heating at the skin of the bundle or at the skin of the cables, so as to perform a calculation that is conservative. Thus, with cabling that has been dimensioned using this method, the real temperature reached for the currents $i_1, i_2, \ldots, i_n$ flowing in the cables is necessarily less than the authorized maximum temperature.

Figure 3:
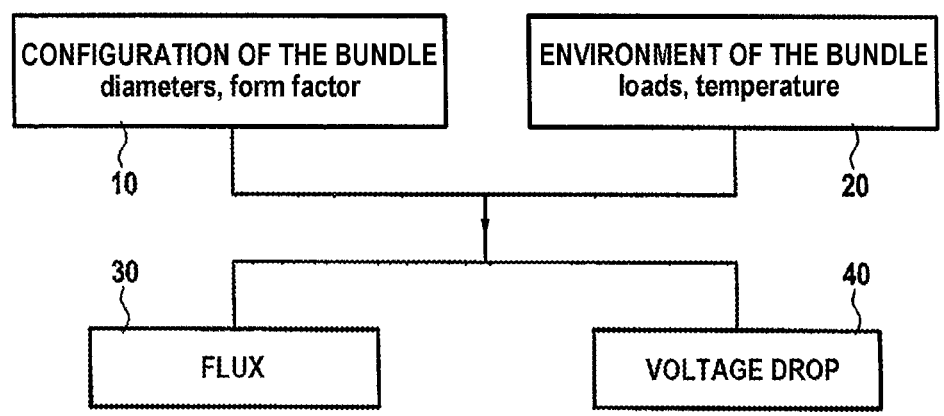
FIG. 3 shows an implementation of the invention.

The method is shown in greater detail in FIG. 3. Account is taken of the configuration of the bundle 10, including in particular, but not necessarily only, the diameters of the cables and the form factors of the cables and of the bundle. Account is also taken of the environment of the cables 20, including in particular, but not necessarily only, the electrical loads applied to each of the cables, and ambient temperature and pressure.

The method makes it possible to obtain results showing whether the bundle under study under the envisaged conditions complies with a constraint on heat fluxes 30 and a constraint on the voltage drop 40 observed on the modeled bundle segment.

The sum of the incoming energy fluxes is calculated on the basis of the following formula:

$$\phi_{incoming} = \Sigma_{cables} \text{ (linear resistance*segment length*current}^2\text{)}$$

The outgoing energy flux is calculated using the maximum authorized surface temperature as mentioned above and taking account of the characteristics of the environment. This flux is made up of a radiant flux and a convective flux and it is based on the following formulae:

$$\phi_{outgoing} = \phi_{radiant} + \phi_{convective}$$

$$\phi_{radiant} = \text{emissivity*form factor}*\sigma*\text{area}*(T_{surface}^4 - T_{ambient}^4)$$

$$\phi_{convective} = h_{convective}*\text{area}*(T_{surface} - T_{ambient})$$

where $\sigma$ represents the Stefan Boltzmann constant and the constant h is set as a function of pressure and temperature, and thus in particular of altitude, and for further simplification on the stage of flight. It should be recalled that emissivity is related to the irradiating material, in this case each of the cables or possibly the protection applied to the cables (sheaths providing protection against fire, electromagnetic interference, mechanical attacks, . . . ).

The incoming and outgoing fluxes are compared in order to determine whether the heat flux constraint 30 is satisfied, with this constraint not being satisfied if the incoming flux is greater than the outgoing flux.

The expected voltage drops are also calculated for each of the cables, with the above-mentioned temperatures and currents. Voltage drop is calculated using Ohm's law U=RI, where R is preferably corrected with the maximum authorized temperature or the temperature determined for the bundle, and this calculation is automated. Optionally, the sum of the individual voltage drops calculated for each bundle segment is calculated. The voltage drop as calculated in this way is compared with the maximum drop authorized in the application, e.g. as a function of specifications set out in specifications, and while taking account of the environment of the bundle. This is how the voltage drop constraint 40 is verified.

If the constraints 30 and 40 are satisfied, it is then possible to reiterate the process with bundles of smaller dimensions, so as to reduce the overall weight of the cabling, with this continuing until the constraints are no longer satisfied. The cabling is finally dimensioned as a function of these results.

The mathematical method as described above can be applied during a predesign stage, thus making it possible to have a first estimate for the sections to be used for each bundle, even if the system is still incomplete. This can be helpful, in particular for estimating the diameter of a bundle and possibly for deciding against certain bundles during the design stage, if the estimated bundle diameter exceeds the maximum authorized diameter.

This method of dimensioning can also be applied to verifying an existing configuration, thus making it possible to determine quickly whether electrothermal constraints are satisfied by an apparatus. If not, those constraints that are not satisfied are all identified and specified in order to change the bundles.

This method of dimensioning can also be applied for correcting a configuration that does not satisfy one or more constraints. Thus, by using automation, it is possible to modify the sections of the bundles in order to correct the constraints that are not satisfied by a system.

Finally, the method can be used for optimizing a configuration. Automation makes it possible to modify the sections of bundles in order to optimize them on the system weight criterion while complying with all of the thermal and electrical requirements.

This solution improves the dimensioning of bundles since it enables a significant weight saving to be obtained on the cabling of an airplane, it provides better knowledge about the heat fluxes in various zones of the airplane, better knowledge of heat losses due to the cabling, and it enables satisfied constraints to be determined quickly, including for a system of large size, because the calculations can be automated and because of the automatic optimization of the dimensioning of the airplane cabling as a whole.

In a particular implementation, after calculating the outgoing heat flux, attention is given to whether it is compatible with the environment in which the bundle is to be installed, e.g. following a path under a floor between the passenger floor of an airliner and the ceiling of a hold, or indeed following a path between passenger cabin trim and the skin of the airplane, both of which are confined spaces with relatively little ventilation. It is verified whether the surface temperature of the bundle remains similar to that previously determined and/or compatible with safety and operating specifications.

"Comprises/comprising" when used in this specification is taken to specify the presence of stated features but does not preclude the presence or addition of one or more other features.

The invention is not limited to the implementations described, but extends to any variant coming within the ambit of the scope of the claims.

The above description is given by way of example, and not limitation. Given the above disclosure, one skilled in the art could devise variations that are within the scope of the invention. Further, the various features of the embodiments or examples disclosed herein can be used alone or in varying combinations with each other, and are not intended to be limited to the specific combinations disclosed herein.

The invention claimed is:

1. A method of characterizing a bundle of electrical cables, comprising:
    taking into consideration for at least one surface temperature of the cables:
        first at least one sum of incoming heat fluxes calculated for each cable for a heating effect due to an electrical resistance of each cable passing a respective electric current, and
        second an outgoing heat flux calculated for a heat given off by the bundle into its environment in order to make a dimensioning of the cables compatible with their use, wherein making the dimensioning of the cables compatible with their use includes confirming that a predetermined level of heating is not exceeded,
    comparing the at least one sum of incoming heat fluxes to the outgoing heat flux to determine whether the bundle satisfies a predetermined heat flux constraint; and
    evaluating, for at least one power cable of the bundle, a voltage drop calculated between two ends of the cable to determine whether the bundle satisfies a predetermined voltage drop constraint;
    wherein the bundle of electrical cables includes a plurality of cables arranged in parallel.

2. The method according to claim 1, wherein the consideration of said sum of incoming fluxes and said outgoing flux comprises calculating the sum of incoming fluxes and the outgoing flux for a given temperature constituting a maximum level of heating and comparing the numerical values of the incoming fluxes and the outgoing flux to confirm that the maximum level of heating is not exceeded.

3. The method according to claim 1, wherein the consideration of said sum of incoming fluxes and said outgoing flux comprises solving an equation to obtain temperatures that are actually reached in operation.

4. The method according to claim 1, wherein said sum of incoming fluxes and said outgoing flux are compared at a maximum temperature at which the cables can operate without degradation.

5. The method according to claim 1, wherein said sum of incoming fluxes and said outgoing flux are compared at a maximum operating temperature for human operators acting on the cables.

6. The method according to claim 1, wherein said sum of incoming fluxes and of said outgoing flux are compared at currents corresponding to a maximum authorized temperature rise in operation for limiting losses by a Joule effect in the cables.

7. The method according to claim 1, wherein said sum of incoming fluxes and said outgoing flux are compared at different temperatures in order to determine the temperatures actually reached.

8. The method according to claim 1, for performing preliminary design of the cable bundle by determining diameters of the cables or by recommending that one or more cables be excluded from the bundle.

9. The method according to claim 1, for modifying a bundle design by reducing a weight of the bundle.

10. The method according to claim 1, further including comparing the outgoing heat flux and a capacity of the environment for which the bundle is designed to dissipate heat.

11. The method according to claim 1, wherein a material and a load specific to each cable of the bundle are taken into account when calculating fluxes.

12. The method according to claim 1, wherein the bundle of cables includes at least one cable with a cross-section that varies along a length of the at least one cable.

13. The method according to claim 1, wherein the bundle is a bundle for aircraft, and wherein the method further includes calculating the temperature rise of the cables in the bundle during each stage of flight in order to take account of loading cycles of equipment, of temperature and pressure variations in zones of the aircraft, and of the characteristics of zones of the aircraft.

14. A bundle of cables fabricated by a method of fabrication including characterization in accordance with claim 1.

15. The method according to claim 1, wherein the heat flux constraint is satisfied when the sum of incoming heat flux is less than the outgoing heat flux, and not when the sum of incoming heat flux is greater than the outgoing flux.

16. The method according to claim 1, further including calculating a voltage drop for each cable of the bundle.

17. The method according to claim 1, wherein the sum of incoming heat flux is governed by the equation:

$$\Sigma_{cables} \text{ (linear resistance*segment length*current}^2).$$

18. The method according to claim 1, wherein the outgoing heat flux is governed by the equations:

$$\varphi_{outgoing} = \varphi_{radiant} + \varphi_{convective};$$

$$\varphi_{radiant} = \text{emissivity*form factor}*\sigma*\text{area}*(T_{surface}^4 - T_{ambient}^4); \text{ and}$$

$$\varphi_{convective} = h_{convective}*\text{area}*(T_{surface} - T_{ambient});$$

where, σ is the Stefan Boltzmann constant, $h_{convective}$ is based on a pressure, temperature, and altitude of a stage of flight, the emissivity is based on a material of each of the cables and/or a material surrounding each of the cables, and the form factor is a form factor of the cables.

19. The method according to claim 15, further including calculating a voltage drop for each cable of the bundle, wherein:

the sum of incoming heat flux is governed by the equation $\Sigma_{cables}$ (linear resistance*segment length*current$^2$); and
the outgoing heat flux is governed by the equations:

$$\varphi_{outgoing} = \varphi_{radiant} + \varphi_{convective};$$

$$\varphi_{radiant} = \text{emissivity*form factor}*\sigma*\text{area}*(T_{surface}^4 - T_{ambient}^4); \text{ and}$$

$$\varphi_{convective} = h_{convective}*\text{area}*(T_{surface} - T_{ambien});$$

where, σ is the Stefan Boltzmann constant, $h_{convective}$ is based on a pressure, temperature, and altitude of a stage of flight, the emissivity is based on a material of each of the cables and/or a material surrounding each of the cables, and the form factor is a form factor of the cables.

20. The method according to claim 19, wherein the bundle is a bundle for aircraft, and wherein the method further includes calculating the temperature rise of the cables in the bundle during each stage of flight in order to take account of loading cycles of equipment, of temperature and pressure variations in zones of the aircraft, and of the characteristics of zones of the aircraft.

* * * * *